United States Patent [19]

Lamphere et al.

[11] Patent Number: 4,553,921
[45] Date of Patent: Nov. 19, 1985

[54] ELECTRICALLY HEATED ICE CREAM SCOOP

[76] Inventors: Carla A. Lamphere, c/o George Spector, 3615 Woolworth Bldg, 233 Broadway; George Spector, 3615 Woolworth Bldg., 233 Broadway, both of New York, N.Y. 10007

[21] Appl. No.: 536,845

[22] Filed: Sep. 29, 1983

[51] Int. Cl.⁴ .......................... A23G 9/00; B29C 1/00
[52] U.S. Cl. .................................. 425/279; 219/229; 219/241; 219/242; 425/281
[58] Field of Search ............... 425/162, 163, 276, 279, 425/278, 165, 281 X, 282; 30/149, 327, 140; 219/227, 240, 242, 228, 241, 246, 250, 252, 229; 200/157

[56] References Cited

U.S. PATENT DOCUMENTS

| | | | |
|---|---|---|---|
| 2,056,951 | 10/1936 | Bohall et al. | 219/227 |
| 2,114,703 | 4/1938 | Conner | 425/276 |
| 2,256,770 | 9/1941 | Armstrong | 219/441 |
| 2,715,175 | 8/1955 | Jacobson | 219/228 |
| 2,863,036 | 12/1958 | Mitchell et al. | 30/140 |
| 2,951,927 | 9/1960 | Weller | 219/240 |
| 3,325,627 | 6/1967 | Adler et al. | 30/140 |
| 3,476,059 | 11/1969 | Anderson | 219/240 |
| 3,749,870 | 7/1973 | Oakes | 200/157 |
| 3,892,024 | 7/1975 | Van Zyl | 30/140 |
| 3,911,241 | 10/1975 | Jarrard | 200/157 |
| 4,074,110 | 2/1978 | Slaughter | 30/140 |

Primary Examiner—W. E. Hoag

[57] ABSTRACT

An electrical ice cream dipper is provided and consists of a handle portion having a finger grip area, a scoop portion having a semi-spherical bowl therein affixed to the handle portion, means for heating the scoop portion, means for controlling the temperature in the scoop portion and a stand having a pair of folding legs built into the handle portion so that the scoop portion will be supported when not in use.

2 Claims, 5 Drawing Figures

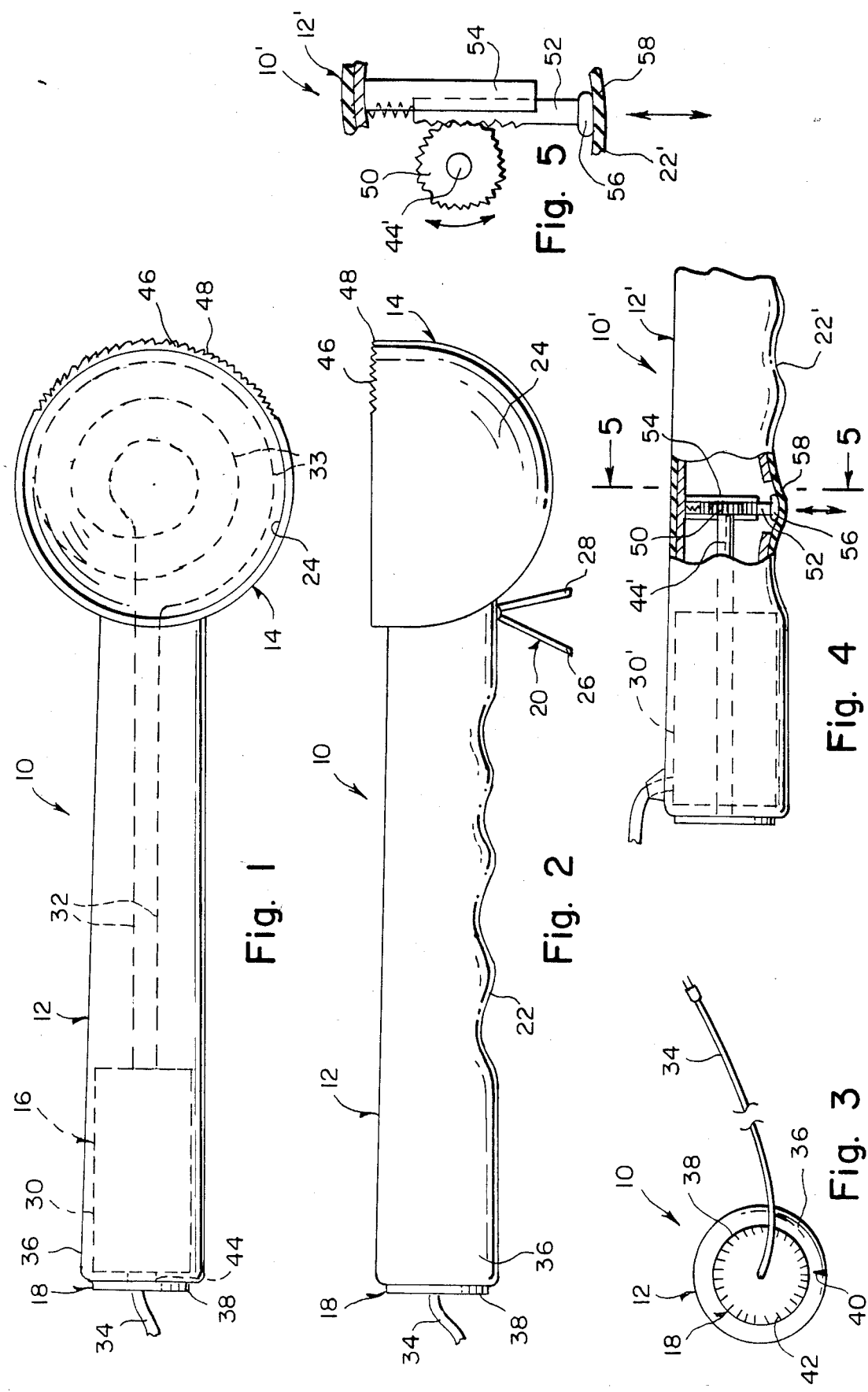

ELECTRICALLY HEATED ICE CREAM SCOOP

BACKGROUND OF THE INVENTION

The instant invention relates generally to ice cream scoops and more specifically it relates to an electric ice cream dipper to make scooping and serving of ice cream.

If ice cream is kept in a very cold freezer it will become very hard. When a person wants to take some to eat it will be very difficult to remove some from its container. This situation is not desirable so accordingly it is in need of an improvement.

SUMMARY OF THE INVENTION

A principle object of the present invention is to provide an electric ice cream dipper that has a variable degree heating unit.

Another object is to provide an electric ice cream dipper that has penetrating heated jaw grooves.

An additional object is to provide an electric ice cream dipper that is strong, durable and has no moving parts on the scoop.

A further object is to provide an electric ice cream dipper that is simple and easy to use.

A still further object is to provide an electric ice cream dipper that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a top view of the invention.
FIG. 2 is a side view.
FIG. 3 is an end view of the handle.
FIG. 4 is a partial side view of a modification of the handle with parts broken away.
FIG. 5 is a partial cross sectional view taken along line 5—5 in FIG. 4.

DETAILED DESCRIPTION OF THE PREFERRED EMBODIMENTS

Turning now descriptively to the drawings, in which similar reference characters denote similar elements throughout the several views, FIGS. 1 through 3 illustrates an electrical ice cream dipper 10 that basically consists of a handle portion 12, a scoop portion 14, a means 16 for heating the scoop portion 14, a means 18 for controlling the temperature in the scoop portion 14 and a stand 20.

The handle portion 12 has a finger grip area 22 while the scoop portion 14 has a semi-spherical bowl 24 therein affixed to the handle portion 12. The stand 20 has a pair of folding legs 26 and 28 built into the handle portion 12 so that the scoop portion 14 will be supported when not in use.

The means 16 for heating the scoop portion 14 basically consists of a temperature control element 30, an insulated heating wire 32, and an elongated power cord 34.

The temperature control element 30 is built within far end 36 of the handle portion 12. The insulated heating wire 32 extends from engagement with the heating element 30 through the handle portion 12 into the scoop portion 14. The heating wire 32 spirals at 33 within the scoop portion 14 three to four times to heat the scoop portion 14. The elongated power cord 34 extends outwardly from engagement with the temperature control element 30.

The means 18 for controlling the temperature in the scoop portion 14 basically consists of a temperature control knob 38 and a dial temperature locator arrow 40.

The temperature control knob 38 has a temperature degree dial 42 thereon (see FIG. 3). The knob 38 is rotatably affixed to the temperature control element 30 via a shaft 44. The dial temperature locator arrow 40 is placed on the far end 36 of the handle portion 12. The temperature control knob 38 can be set for adjusting the amount of current flow to control the amount of temperature in the scoop portion 14.

The electrical ice cream dipper 10 further comprises jaw like indentions 46 on front edge 48 of the scoop portion 14 for easier penetration of ice cream.

FIGS. 4 and 5 shows a modification in the ice cream dipper 10'. The ice cream dipper 10' basically consists of a pinon gear 50 and a spring loaded rack 52.

The pinon gear 50 is rotatably affixed to the heating element 30' via the shaft 44' within the handle portion 12'. The spring loaded rack 52 is slideably affixed in a track 54 within the handle portion 12'. End 56 of the rack 52 engages a flexible area 58 of the finger grip area 22' so that when a person squeezes the handle portion 12', the rack 52 will turn the pinon gear 50 for adjusting the amount of current flow to control the amount of temperature in the scoop portion (not shown).

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An electrical ice cream dipper which comprises:
   (a) a handle portion having a finger grip area;
   (b) a scoop portion having a semi-spherical bowl therein affixed to the handle portion;
   (c) means for heating the scoop portion;
   (d) means rotatable in the handle portion for controlling the temperature in the scoop portion;
   (e) means mounted in the handle in combination with a deformable portion of said finger grip area for rotating said rotatable means to cause the third said means to coact with the second said means to affect temperature control;
   (f) the means for heating the scoop portion comprising an insulated heating wire extending from engagement with the means for controlling the temperature through the handle portion into the scoop portion and disposed in a spiral within the scoop portion to heat the scoop portion.

2. An electrical ice cream dipper as recited in claim 1, wherein said connection of the third said means further comprises:
   (a) a pinon gear rotatably affixed to the heating element via the shaft within the handle portion; and
   (b) a spring loaded rack slidably affixed in a track within the handle portion, end of the rack engaging deformible portion of the finger grip area so that when a person squeezes the handle portion the rack will turn the pinon gear for adjusting the amount of current flow to control the amount of temperature in the scoop portion.

* * * * *